United States Patent
Chinn et al.

(10) Patent No.: US 9,180,403 B2
(45) Date of Patent: *Nov. 10, 2015

(54) AQUEOUS SOLUTIONS OF AMINE FUNCTIONALIZED IONIC COMPOUNDS FOR CARBON CAPTURE PROCESSES

(75) Inventors: Daniel Chinn, Bay Point, CA (US); Russell Evan Cooper, Fairfield, CA (US); Zunqing He, San Rafael, CA (US); James H. Davis, Jr., Mobil, AL (US); Kevin N. West, Mobil, AL (US); Hye Kyung Timken, Albany, CA (US); Michael S. Driver, San Francisco, CA (US)

(73) Assignees: Chevron U.S.A. Inc., San Ramon, CA (US); University of South Alabama, Mobile, AL (US)

( * ) Notice: Subject to any disclaimer, the term of this patent is extended or adjusted under 35 U.S.C. 154(b) by 784 days.

This patent is subject to a terminal disclaimer.

(21) Appl. No.: 12/930,208

(22) Filed: Dec. 30, 2010

(65) Prior Publication Data

US 2012/0171094 A1   Jul. 5, 2012

(51) Int. Cl.
*C07C 211/62* (2006.01)
*C07C 211/63* (2006.01)
*C07C 211/64* (2006.01)
*B01D 53/14* (2006.01)

(52) U.S. Cl.
CPC ........ *B01D 53/1475* (2013.01); *B01D 53/1493* (2013.01); *B01D 2252/204* (2013.01); *B01D 2252/2056* (2013.01); *B01D 2252/30* (2013.01); *B01D 2252/502* (2013.01); *B01D 2258/0283* (2013.01); *Y02C 10/04* (2013.01); *Y02C 10/06* (2013.01)

(58) Field of Classification Search
CPC .............. B01J 31/0277; B01J 31/0278; B01J 31/0285; B01J 31/0288; B01J 31/0291; B01J 31/0298; B01J 31/0268; B01J 31/0239; B01J 31/0225; C07C 309/69; C07C 323/25; C07C 2531/025
See application file for complete search history.

(56) References Cited

U.S. PATENT DOCUMENTS

| | | |
|---|---|---|
| 5,376,614 A | 12/1994 | Birbara et al. |
| 6,579,343 B2 | 6/2003 | Brennecke et al. |
| 7,208,605 B2 | 4/2007 | Davis, Jr. |
| 7,459,134 B2 | 12/2008 | Cadours et al. |
| 7,527,775 B2 | 5/2009 | Chinn et al. |

(Continued)

FOREIGN PATENT DOCUMENTS

| | | |
|---|---|---|
| CN | 101785954 A | 7/2010 |
| WO | WO 2008/122030 | 10/2008 |

(Continued)

OTHER PUBLICATIONS

U.S. Appl. No. 12/930,207, filed Dec. 30, 2010, Chinn, et al.

(Continued)

*Primary Examiner* — Stuart Hendrickson
*Assistant Examiner* — Daniel Berns
(74) *Attorney, Agent, or Firm* — M. Carmen & Associates, PLLC

(57) ABSTRACT

An aqueous ionic absorbent solution is disclosed containing (a) about 15 wt. % to about 80 wt. % of one or more diluents, based on the total weight of the aqueous ionic absorbent solution; and (b) an ionic absorbent containing a cation and an anion comprising an amine moiety.

15 Claims, 6 Drawing Sheets

(56) References Cited

U.S. PATENT DOCUMENTS

| | | |
|---|---|---|
| 7,744,838 B2 | 6/2010 | Davis, Jr. |
| 8,911,539 B2 * | 12/2014 | Chinn et al. ............... 95/236 |
| 2002/0189444 A1 | 12/2002 | Brennecke et al. |
| 2006/0251558 A1 | 11/2006 | Chinn et al. |
| 2009/0308248 A1 | 12/2009 | Siskin et al. |

FOREIGN PATENT DOCUMENTS

| | | |
|---|---|---|
| WO | 2010053377 A1 | 5/2010 |
| WO | 2010149669 A1 | 12/2010 |

OTHER PUBLICATIONS

Feng, et al "Absorption of $CO_2$ in the Aqueous Solutions of Functionalized Ionic Liquids and MDEA", Chemical Engineering Journal, Elsevier Sequoia, Lausanne, CH, vol. 160, No. 2 (Jun. 1, 2010) pp. 691-697.

European Search Report issued in European counterpart Application No. 11852592.2-1351 dated May 27, 2015.

* cited by examiner

AQUEOUS SOLUTIONS OF AMINE FUNCTIONALIZED IONIC COMPOUNDS FOR CARBON CAPTURE PROCESSES

BACKGROUND

1. Technical Field

The present invention generally relates to aqueous ionic absorbent solutions for carbon capture processes. The present invention further generally relates to aqueous ionic absorbent solutions containing an amine functionalized ionic absorbent dissolved in a sufficient amount of diluent for use in a carbon dioxide capture process.

2. Description of the Related Art

The removal of carbon dioxide from the natural gas is commercially practiced now in order to obtain natural gas which satisfies sales specifications or other process-dependent requirements.

Carbon dioxide is one of the primary combustion products as fuel is burned and is emitted into the atmosphere as a waste flow in the flue gas. Removal of carbon dioxide from the flue gas is not commonly practiced at present time. As the efforts to control the $CO_2$ emissions to the atmosphere increases, the removal of carbon dioxide from the flue gas may become necessary and to be practiced in an industrial scale in order to satisfy the carbon dioxide emission requirements which are set by air pollution control authorities. The $CO_2$ removal process from natural gas may not be directly applied to the $CO_2$ removal from flue gas since the conditions of these two processes are very different.

Several processes for removing carbon dioxide from gases are known. Examples of such processes for carbon dioxide separation and capture include chemical absorption, physical and chemical adsorption, low-temperature distillation, gas-separation membranes, mineralization/biomineralization, and vegetation. The carbon dioxide absorption process is a unit operation where one or more components in a gas mixture are dissolved in a liquid (solvent). The absorption may either be a purely physical phenomenon or involve a chemical reaction, such as the reaction between carbon dioxide and an amine. Generally, the liquid solvent is an aqueous amine solution for the removal of carbon dioxide from gas streams.

An example of an absorption process is the process for removing carbon dioxide from flue gas by means of monoethanolamine (MEA) or diethanolamine (DEA). The flue gas is led into an absorption column where it comes into contact with MEA or DEA which absorbs the carbon dioxide molecules. Typically, these amines, MEA and DEA, are used as 25 to 30 wt. % amine in an aqueous solution. The amine solution enters the top of an absorption tower while the carbon dioxide containing gaseous stream is introduced at the bottom. The solvent is then led to a desorption process where the liquid is heated, and the carbon dioxide molecules are removed from the solvent by means of a desorption column. carbon dioxide and water emerge from the amine solution and the water is separated by condensing the water vapor in a heat exchanger. The solvent is cooled and then recycled back to the absorption tower for additional carbon dioxide absorption.

Solvent chemistry, corrosion, and viscosity consideration limit the amine strength to about 30 wt. % MEA. At flue-gas carbon dioxide partial pressures (e.g., 0.04 to 0.15 atm), the carbon dioxide-rich ("rich") solvent loading is about 0.42 to 0.45 mol $CO_2$/mol MEA and the $CO_2$-lean ("lean") solvent loading is about 0.15 to 0.17 mol $CO_2$/mol MEA. The difference in loading (0.25 to 0.3 mol $CO_2$/mol MEA) sets the circulation rate of the amine and influences capital and operating costs.

MEA also has disadvantages in that it has several mechanisms of loss, and a continuous makeup of MEA is required by post-combustion processes. For example, MEA degrades in the presence of oxygen from the flue gas. Thus, to limit the oxidative degradation, corrosion inhibitors may be used. MEA also degrades into heat-stable salts (HSS) from reaction with carbon dioxide. To solve this problem, a reclaimer would be added on the regenerator to separate the HSS from the amine solution to provide suitable makeup MEA. Lastly, the volatility of MEA results in the treated flue gas to contain in excess of 500 ppmv MEA when leaving the absorber to the vent. To address this, a wash section is added at the top of the absorber and makeup water is added to scrub the MEA from the treated flue gas. The mixture is then sent down the column along with the remaining lean solvent to absorb carbon dioxide from the incoming flue gas. Water washing can cut the MEA emissions to about 3 ppmv.

MEA may also degrade over time thermally, thereby limiting the temperature of operation in the absorber and regenerator. With a cooled flue gas inlet temperature of about 56° C., the absorber column may operate at a bottoms temperature of 54° C. and a pressure of 1.1 bar while the regenerator may operate at a bottoms temperature of 1.9 bar and 121° C. (2 bar saturated steam). For 30 wt. % MEA, the amine reboiler steam temperature is kept at less than 150° C. (4.7 bar saturated steam) to limit thermal degradation.

MEA also degrades in the presence of high levels of NOx and SOx which are common in facilities that burn coal and fuel oil. However, if carbon dioxide removal from a high NOx and SOx containing flue gas is desired, separate process facilities such as SCR (Selective Catalytic Reduction) and FGD (Flue Gas Desulfurization) are needed for removal of NOx and SOx, respectively.

Accordingly, to have a superior, post-combustion carbon dioxide removal technology that is better than those known in the art (30 wt. % MEA and similar aqueous amines), it is desirable to develop an improved carbon dioxide absorption solvent and a process for its use.

SUMMARY

In accordance with one embodiment of the present invention, there is provided an aqueous ionic absorbent solution comprising (a) about 15 wt. % to about 80 wt. % of one or more diluents, based on the total weight of the aqueous ionic absorbent solution; and (b) an ionic absorbent containing a cation and an anion comprising an amine moiety.

In accordance with a second embodiment of the present invention, there is provided an aqueous ionic absorbent solution comprising (a) about 15 wt. % to about 80 wt. % of one or more diluents, based on the total weight of the aqueous ionic absorbent solution; and (b) an ionic absorbent containing a cation and an anion comprising an amine moiety, wherein the anion is represented by the general formula:

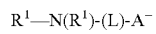

wherein $R^1$ is the same or different and includes hydrogen, a straight or branched $C_1$ to $C_{30}$ substituted or unsubstituted alkyl group, a $C_1$ to $C_{20}$ ester-containing group, a substituted or unsubstituted $C_3$ to $C_{30}$ cycloalkyl group, a substituted or unsubstituted $C_3$ to $C_{30}$ cycloalkylalkyl group, a substituted or unsubstituted $C_3$ to $C_{30}$ cycloalkenyl group, a substituted or unsubstituted $C_5$ to $C_{30}$ aryl group, a substituted or unsubstituted $C_5$ to $C_{30}$ arylalkyl group, a substituted or unsubstituted $C_5$ to $C_{30}$ heteroaryl group, a substituted or unsubstituted $C_3$ to $C_{30}$ heterocyclic ring, a substituted or unsubstituted $C_4$ to $C_{30}$ heterocyclolalkyl group, a substituted or unsubstituted $C_6$ to $C_{30}$ heteroarylalkyl group, or R and $R^1$ together with the nitrogen atom to which they are bonded are joined together to form a heterocyclic group; L is a linking group; and $A^-$ is an anionic moiety.

In accordance with a third embodiment of the present invention, there is provided the use of an aqueous ionic absorbent solution comprising (a) about 15 wt. % to about 80 wt. % of one or more diluents, based on the total weight of the aqueous ionic absorbent solution; and (b) an ionic absorbent containing a cation and an anion comprising an amine moiety in the capture of carbon dioxide from a gas stream containing carbon dioxide.

In accordance with a fourth embodiment of the present invention, there is provided a process for separating carbon dioxide ($CO_2$) from a carbon dioxide-containing gas stream, the process comprising (a) contacting the carbon dioxide-containing gas stream with an aqueous ionic absorbent solution under absorption conditions to absorb at least a portion of the $CO_2$ from the carbon dioxide-containing gas stream and form a $CO_2$-absorbent complex; wherein the aqueous ionic absorbent solution comprises (i) about 15 wt. % to about 80 wt. % of one or more diluents, based on the total weight of the aqueous ionic absorbent solution; and (ii) an ionic absorbent containing a cation and an anion comprising an amine moiety; and (b) recovering a gaseous product having a reduced $CO_2$ content.

The present invention advantageously provides an aqueous ionic absorbent solution containing an amine functionalized ionic absorbent dissolved in a sufficient amount of one or more diluents for use in a carbon dioxide capture process. The aqueous ionic absorbent solution is composed of a cation-anion pair, which includes a low molecular weight cation and an anion containing an amine functional group. By controlling the molecular weight and type of cation of the ionic absorbent as well as the diluent content, the aqueous ionic absorbent solution will retain an acceptable viscosity to facilitate rapid absorption and desorption of carbon dioxide in an absorption-stripping $CO_2$ capture process while also maximizing the volumetric capacity of the aqueous ionic absorbent solution for removing $CO_2$ from a process stream.

DETAILED DESCRIPTION

Figure 1:
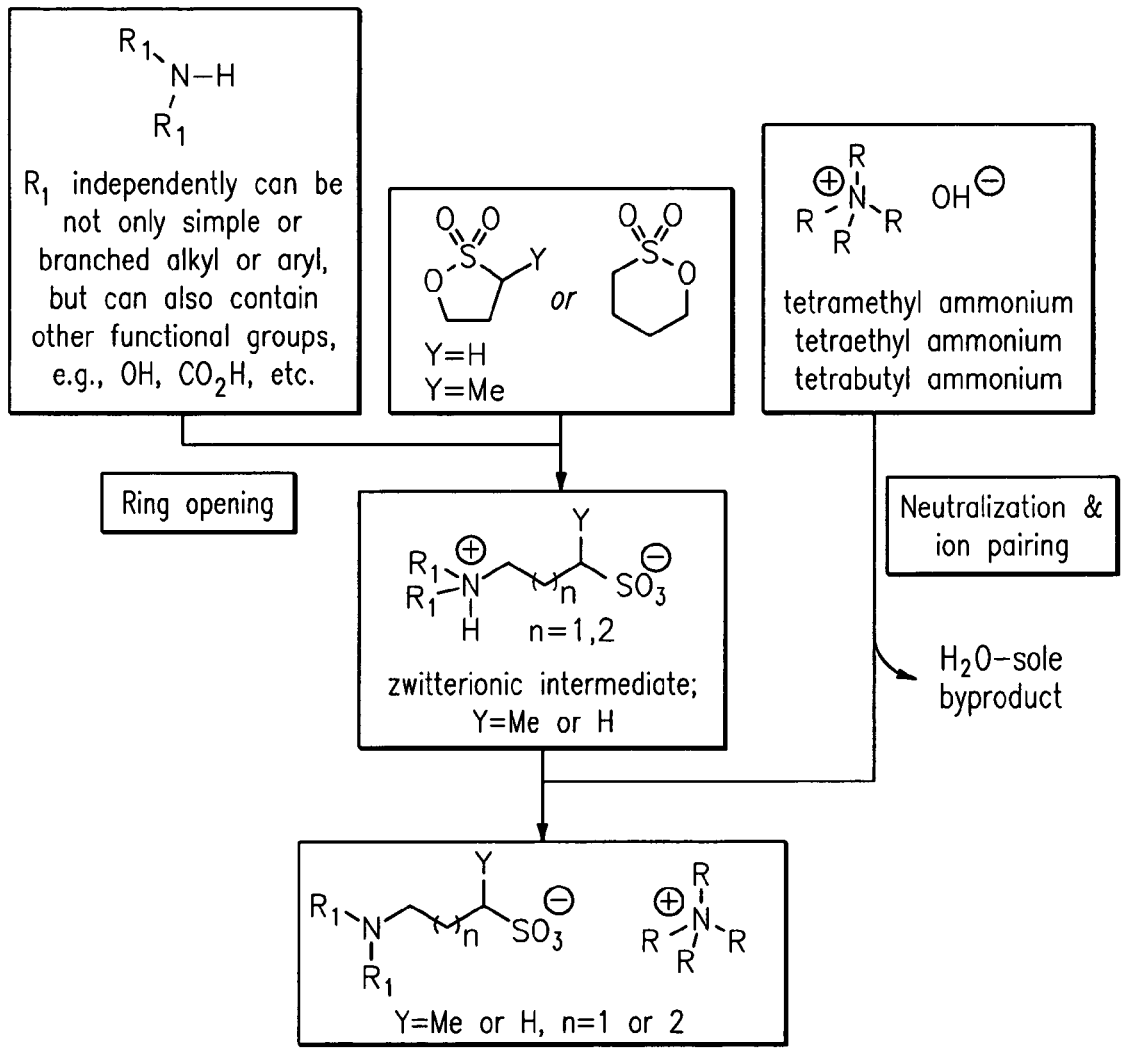
FIGS. 1-4 shows generic synthetic schemes for preparing an ionic absorbent in accordance with the present invention.

The present invention is directed to an aqueous ionic absorbent solution comprising (a) about 15 wt. % to about 80 wt. % of one or more diluents, based on the total weight of the aqueous ionic absorbent solution; and (b) an ionic absorbent containing a cation and an anion comprising an amine moiety.

A suitable diluent includes, by way of example, inert diluents such as water, monohydric alcohols, polyols, and the like and mixtures thereof. Representative examples of suitable monohydric alcohols include $C_1$ to $C_{12}$ alcohols such as methanol, ethanol, isopropanol, 1-propanol, 1-butanol, 2-butanol, t-butanol, 2-methyl-1-propanol, 1-pentanol, 1-hexanol, 1-heptanol, 4-heptanol, 1-octanol, 1-nonyl alcohol, 1-decanol, 1-dodecanol and the like and mixtures thereof.

The polyols for use as a diluent include those having from 2 to about 10 carbon atoms and from two to six hydroxyl groups. Representative examples of suitable polyols include glycerol, triethylene glycol, 2-ethylene glycol, diethylene glycol, 1,2-propylene glycol, 1,3-propylene glycol, tetraethylene glycol, hexylene glycol and the like and mixtures thereof. In one preferred embodiment, the diluent is water.

In general, the amount of diluent added to the ionic absorbent is an amount capable of forming an absorption solvent having an acceptable viscosity to facilitate mass transfer of $CO_2$ into and out of the aqueous ionic absorbent solution in a carbon capture process. The ionic absorbents for use in forming the aqueous ionic absorbent solution of the present invention have a relatively high viscosity in the absence of diluent. As such, the rate of $CO_2$ absorption for the ionic absorbents in the absence of one or more diluents is low and takes a relatively long time to reach the equilibrium. It has surprisingly been discovered that the use of a sufficient amount of diluent, such as water, lowers the viscosity of the ionic absorbent such that the absorption rate of $CO_2$ is significantly increased and equilibrium $CO_2$ loading is reached more quickly than without the diluents.

A suitable viscosity for the aqueous ionic absorbent solution in a carbon capture process will ordinarily be from about 0.1 to about 100 centistoke (cSt). In one embodiment, a suitable viscosity for the aqueous ionic absorbent solution in a carbon capture process can range from about 0.5 to about 40 cSt.

In one embodiment, the diluent content in the aqueous ionic absorbent solution is from about 15 to about 80 wt. %, based on the total weight of the aqueous ionic absorbent solution. In one embodiment, the diluent content in the aqueous solution is from about 20 to about 70 wt. %, based on the total weight of the aqueous ionic absorbent solution. In one embodiment, the diluent content in the aqueous solution is from about 40 to about 60 wt. %, based on the total weight of the aqueous ionic absorbent solution. Surprisingly, the water content in the solution has relatively little effect on the uptake of $CO_2$ measured as moles of $CO_2$ per mol of ionic absorbent for the aqueous ionic absorbent solutions of the present invention. Accordingly, the content of diluent can be adjusted for optimum viscosity with little to no detrimental effects due to dilution.

It is also desirable to maintain the ionic absorbent concentration sufficiently high in order to keep the overall absorption solution volume to an acceptable size for the size of absorption equipment design. For example, to lower the overall cost, it is desirable to use less amount of diluent.

The ionic absorbent is generally composed of a cation and an anion. In one embodiment, the ionic absorbent is a liquid ionic absorbent and includes a category of compounds which are made up entirely of ions and are liquid at or below process temperatures including room temperature. The ionic liquids may have low melting points, for example, from $-100°$ C. to $200°$ C. They tend to be liquid over a very wide temperature range, with a liquid range of up to about $500°$ C. or higher. Ionic liquids are generally non-volatile, with effectively no vapor pressure. Many are air and water stable, and can be good solvents for a wide variety of inorganic, organic, and polymeric materials. In another embodiment, the ionic absorbent is a solid ionic absorbent and includes a category of compounds which are made up entirely of ions and are solid in an anhydrous state at room temperature.

The ionic absorbent for use in forming the aqueous ionic absorbent solution of the present invention includes a cation and an anion comprising an amine moiety. The properties of the ionic absorbent can be tailored by varying the cation and anion pairing. The amine moiety advantageously provides selectivity for the aqueous ionic solution to complex with $CO_2$.

In order for the aqueous ionic absorbent solutions containing the ionic absorbent to have a high volumetric/absorption capacity (mol $CO_2$/mL absorbent), it is desirable to have the molecular weight of the neat ionic absorbent as low as possible to achieve the maximum molar concentration of ionic absorbent in the solution per weight of ionic absorbent basis which in turn will reduce the cost of the absorption solution and the equipment size for the $CO_2$ capturing process.

It is believed that the cation group of the ionic absorbent has little impact on the molar $CO_2$ absorption capacity. Accordingly, the molecular weight of the cation can be as low as possible thereby lowering the overall molecular weight of the ionic absorbent. In one embodiment, the molecular weight of the cation can range from about 18 to about 500 atomic mass unit (AMU) (g/mole). In another embodiment, the molecular weight of the cation can range from about 18 to about 400 atomic mass unit (AMU) (g/mole).

In one embodiment, a cation is a secondary, tertiary or quaternary phosphonium cation represented by the general formula:

wherein R is the same or different and is hydrogen, a substituted or unsubstituted alkyl group, a substituted or unsubstituted fluoroalkyl group, a substituted or unsubstituted cycloalkyl group, a substituted or unsubstituted aryl group, a substituted or unsubstituted heteroaryl group, a substituted or unsubstituted arylalkyl group, a substituted or unsubstituted heteroarylalkyl group, or —$(CH_2)_n$—R', wherein R' represents independently for each occurrence a substituted or unsubstituted cycloalkyl group, a substituted or unsubstituted aryl group, or a substituted or unsubstituted heteroaryl group; and n represents independently for each occurrence an integer in the range 1 to 10 inclusive.

In one embodiment, a cation is a secondary, tertiary or quaternary ammonium cation represented by the general formula:

wherein R is the same or different and is hydrogen, a substituted or unsubstituted alkyl group, a substituted or unsubstituted fluoroalkyl group, a substituted or unsubstituted cycloalkyl group, a substituted or unsubstituted aryl group, a substituted or unsubstituted heteroaryl group, a substituted or unsubstituted arylalkyl group, a substituted or unsubstituted heteroarylalkyl group, or —$(CH_2)_n$—R', wherein R' represents independently for each occurrence a substituted or unsubstituted cycloalkyl group, a substituted or unsubstituted aryl group, or a substituted or unsubstituted heteroaryl group, or three R groups together with the nitrogen atom to which they are bonded can be taken together to represent pyridinium, imidazolium, benzimidazolium, pyrazolium, benzpyrazolium, indazolium, thiazolium, benzthiazolium, oxazolium, benzoxazolium, isoxazolium, isothiazolium, imdazolidenium, guanidinium, quinuclidinium, triazolium, tetrazolium, quinolinium, isoquinolinium, piperidinium, pyrrolidinium, morpholinium, pyridazinium, pyrazinium, piperazinium, triazinium, azepinium, or diazepinium; and n represents independently for each occurrence an integer in the range 1 to 10 inclusive.

In another embodiment, the cation is a Group 1 or Group 2 metal of the Periodic Table. Representative examples of Group 1 metals include lithium, sodium, potassium, rubidium, cesium and the like. Representative examples of Group 2 metals include calcium, barium, magnesium, or strontium and the like.

In one embodiment, a cation includes, but is not limited to, a Group 1 or Group 2 metal of the Periodic Table, an ammonium cation, phosphonium cation, an imidazolium cation, a pyridinium cation, a pyrazolium cation, an oxazolium cation, a pyrrolidinium cation, a piperidinium cation, an alkyl thiazolium cation, an alkyl guanidinium cation, a morpholinium cation, a trialkylsulfonium cation, a triazolium cation, and the like.

In one embodiment, a cation is a trialkyl or a tetraalkyl ammonium cation or phosphonium cation in which the alkyl group of the trialkyl or tetraalkyl is the same or different and is a $C_1$ to $C_{30}$ straight or branched, substituted or unsubstituted alkyl group. In another embodiment, a cation is a tetraalkyl ammonium cation or a tetraalkyl phosphonium cation in which the alkyl group of the tetraalkyl is the same or different and is a $C_1$ to $C_6$ straight or branched, substituted or unsubstituted alkyl group. The cation may contain ring structures where the N or P atom is a part of the ring structure.

Suitable anions for the ionic absorbent include those represented by the general formula:

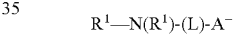

wherein $R^1$ is the same or different and includes hydrogen, a straight or branched $C_1$ to $C_{30}$ substituted or unsubstituted alkyl group, a $C_1$ to $C_{20}$ ester-containing group, a substituted or unsubstituted $C_3$ to $C_{30}$ cycloalkyl group, a substituted or unsubstituted $C_3$ to $C_{30}$ cycloalkylalkyl group, a substituted or unsubstituted $C_3$ to $C_{30}$ cycloalkenyl group, a substituted or unsubstituted $C_5$ to $C_{30}$ aryl group, a substituted or unsubstituted $C_5$ to $C_{30}$ arylalkyl group, a substituted or unsubstituted $C_5$ to $C_{30}$ heteroaryl group, a substituted or unsubstituted $C_3$ to $C_{30}$ heterocyclic ring, a substituted or unsubstituted $C_4$ to $C_{30}$ heterocycloalkyl group, a substituted or unsubstituted $C_6$ to $C_{30}$ heteroarylalkyl group, or R and $R^1$ together with the nitrogen atom to which they are bonded are joined together to form a heterocyclic group; L is a linking group, which can be a bond, or a divalent group selected from the group consisting of a straight or branched $C_1$ to $C_{30}$ substituted or unsubstituted alkyl group, a $C_1$ to $C_{20}$ ester-containing group, a substituted or unsubstituted $C_3$ to $C_{30}$ cycloalkyl group, a substituted or unsubstituted $C_3$ to $C_{30}$ cycloalkylalkyl group, a substituted or unsubstituted $C_3$ to $C_{30}$ cycloalkenyl group, a substituted or unsubstituted $C_5$ to $C_{30}$ aryl group, a substituted or unsubstituted $C_5$ to $C_{30}$ arylalkyl group, a substituted or unsubstituted $C_5$ to $C_{30}$ heteroaryl group, a substituted or unsubstituted $C_3$ to $C_{30}$ heterocyclic ring, a substituted or unsubstituted $C_4$ to $C_{30}$ heterocycloalkyl group, a substituted or unsubstituted $C_6$ to $C_{30}$ heteroarylalkyl group and the like; and $A^-$ is an anionic moiety.

In one embodiment, $A^-$ is $SO_3^-$ or $PO_4^-$ or a conjugate base of multivalent acid.

In one embodiment, $R^1$ are the same or different and include hydrogen or a straight or branched $C_1$ to $C_6$ substituted or unsubstituted alkyl group, L is a divalent straight or branched $C_1$ to $C_6$ substituted or unsubstituted alkyl group and $A^-$ is $SO_3^-$.

Representative examples of alkyl groups for use herein include, by way of example, a straight or branched alkyl chain containing carbon and hydrogen atoms of from 1 to about 30 carbon atoms and preferably from 1 to about 6 carbon atoms with or without unsaturation, to the rest of the molecule, e.g., methyl, ethyl, n-propyl, 1-methylethyl (isopropyl), n-butyl, n-pentyl, etc., and the like.

Representative examples of fluoroalkyl groups for use herein include, by way of example, a straight or branched alkyl group as defined herein having one or more fluorine atoms attached to the carbon atom, e.g., $-CF_3$, $-CF_2CF_3$, $-CH_2CF_3$, $-CH_2CF_2H$, $-CF_2H$ and the like.

Representative examples of substituted or unsubstituted cycloalkyl groups for use herein include, by way of example, a substituted or unsubstituted non-aromatic mono or multicyclic ring system of about 3 to about 20 carbon atoms such as, for example, cyclopropyl, cyclobutyl, cyclopentyl, cyclohexyl, bridged cyclic groups or sprirobicyclic groups, e.g., spiro-(4,4)-non-2-yl and the like, optionally containing one or more heteroatoms, e.g., O and N, and the like.

Representative examples of substituted or unsubstituted cycloalkylalkyl groups for use herein include, by way of example, a substituted or unsubstituted cyclic ring-containing group containing from about 3 to about 20 carbon atoms directly attached to the alkyl group which are then attached to the main structure of the monomer at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of substituted or unsubstituted cycloalkenyl groups for use herein include, by way of example, a substituted or unsubstituted cyclic ring-containing group containing from about 3 to about 20 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of substituted or unsubstituted aryl groups for use herein include, by way of example, a substituted or unsubstituted monoaromatic or polyaromatic group containing from about 5 to about 20 carbon atoms such as, for example, phenyl, naphthyl, tetrahydronapthyl, indenyl, biphenyl and the like, optionally containing one or more heteroatoms, e.g., O and N, and the like.

Representative examples of substituted or unsubstituted arylalkyl groups for use herein include, by way of example, a substituted or unsubstituted aryl group as defined herein directly bonded to an alkyl group as defined herein, e.g., $-CH_2C_6H_5$, $-C_2H_5C_6H_5$ and the like, wherein the aryl group can optionally contain one or more heteroatoms, e.g., O and N, and the like.

Representative examples of fluoroaryl groups for use herein include, by way of example, an aryl group as defined herein having one or more fluorine atoms attached to the aryl group.

Representative examples of ester groups for use herein include, by way of example, a carboxylic acid ester having one to 20 carbon atoms and the like.

Representative examples of heterocyclic ring groups for use herein include, by way of example, a substituted or unsubstituted stable 3 to about 30 membered ring group, containing carbon atoms and from one to five heteroatoms, e.g., nitrogen, phosphorus, oxygen, sulfur and mixtures thereof. Suitable heterocyclic ring groups for use herein may be a monocyclic, bicyclic or tricyclic ring system, which may include fused, bridged or spiro ring systems, and the nitrogen, phosphorus, carbon, oxygen or sulfur atoms in the heterocyclic ring group may be optionally oxidized to various oxidation states. In addition, the nitrogen atom may be optionally quaternized; and the ring radical may be partially or fully saturated (i.e., heteroaromatic or heteroaryl aromatic). Examples of such heterocyclic ring functional groups include, but are not limited to, azetidinyl, acridinyl, benzodioxolyl, benzodioxanyl, benzofurnyl, carbazolyl, cinnolinyl, dioxolanyl, indolizinyl, naphthyridinyl, perhydroazepinyl, phenazinyl, phenothiazinyl, phenoxazinyl, phthalazinyl, pyridyl, pteridinyl, purinyl, quinazolinyl, quinoxalinyl, quinolinyl, isoquinolinyl, tetrazoyl, imidazolyl, tetrahydroquinolinyl, tetrahydroisoquinolinyl, piperidinyl, piperazinyl, 2-oxopiperazinyl, 2-oxopiperidinyl, 2-oxopyrrolidinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, oxazolidinyl, triazolyl, indanyl, isoxazolyl, iso-oxazolidinyl, morpholinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, furyl, tetrahydrofurtyl, tetrahydropyranyl, thienyl, benzothienyl, thiamorpholinyl, thiamorpholinyl sulfoxide, thiamorpholinyl sulfone, dioxaphospholanyl, oxadiazolyl, chromanyl, isochromanyl and the like and mixtures thereof.

Representative examples of heterocycloalkyl groups for use herein include, by way of example, a substituted or unsubstituted heterocylic ring group as defined herein directly bonded to an alkyl group as defined herein. The heterocycloalkyl moiety may be attached to the main structure at carbon atom in the alkyl group that results in the creation of a stable structure.

Representative examples of heteroaryl groups for use herein include, by way of example, a substituted or unsubstituted heterocyclic ring group as defined herein. The heteroaryl ring radical may be attached to the main structure at any heteroatom or carbon atom that results in the creation of a stable structure.

Representative examples of heteroarylalkyl groups for use herein include, by way of example, a substituted or unsubstituted heteroaryl ring group as defined herein directly bonded to an alkyl group as defined herein. The heteroarylalkyl moiety may be attached to the main structure at any carbon atom from the alkyl group that results in the creation of a stable structure.

It will be understood that the term "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction. Representative examples of such substituents include, but are not limited to, hydrogen, fluorine, hydroxyl groups, halogen group, carboxyl groups, cyano groups, nitro groups, oxo (=O), thio(=S), substituted or unsubstituted alkyl, substituted or unsubstituted fluoroalkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, substituted heterocycloalkyl ring, substituted or unsubstituted heteroarylalkyl, substituted or unsubstituted heterocyclic ring, and the like.

Representative examples of ionic absorbents for use in the aqueous ionic absorbent solutions of the present invention includes tetrabutylammonium N-propyl-N-(3-sulfopropyl)amine, tetrabutylphosphonium N-isopropyl-N-(3-sulfopropyl)amine, tetraethylammonium N-isopropyl-N-(3-sulfopropyl)amine and the like and mixtures thereof.

Figure 2:
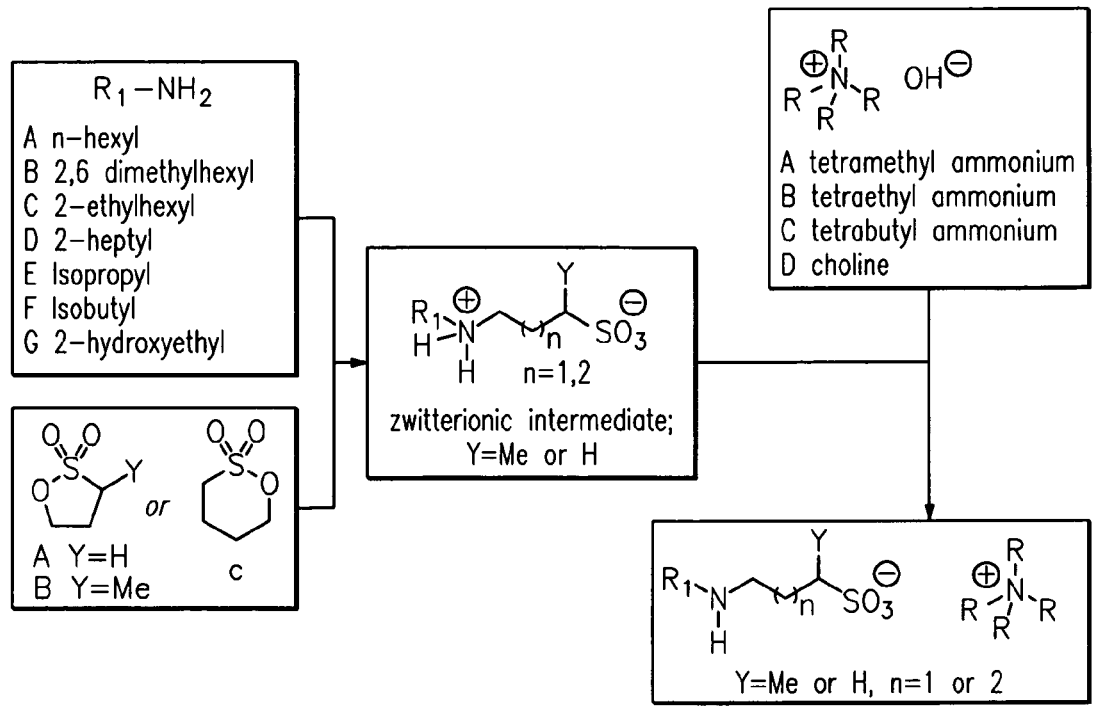
Figure 3:
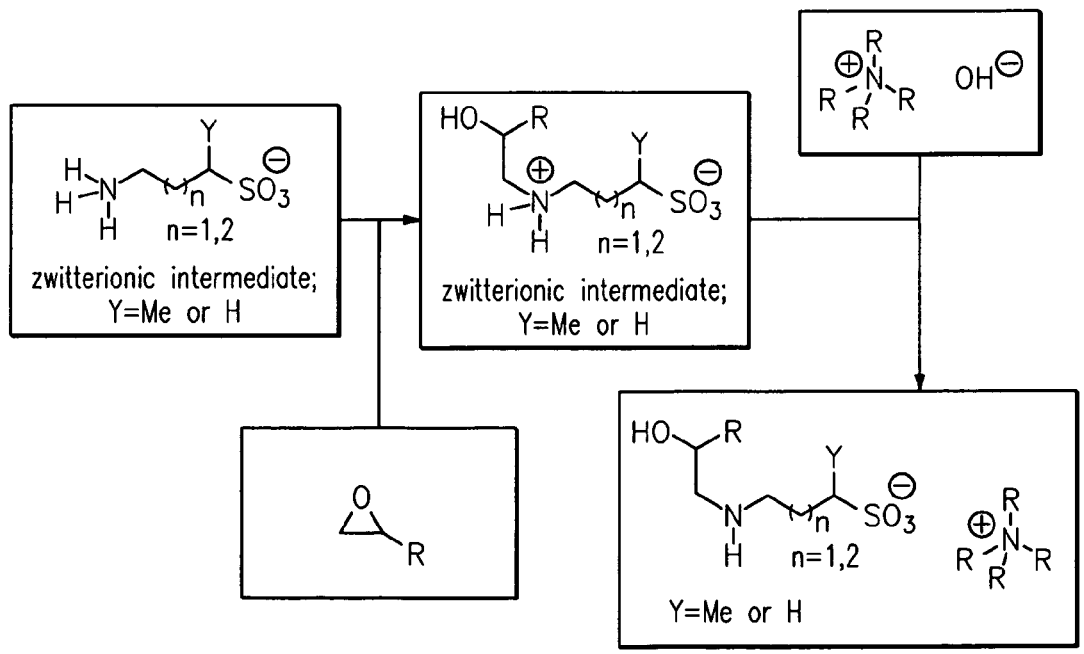
Figure 4:
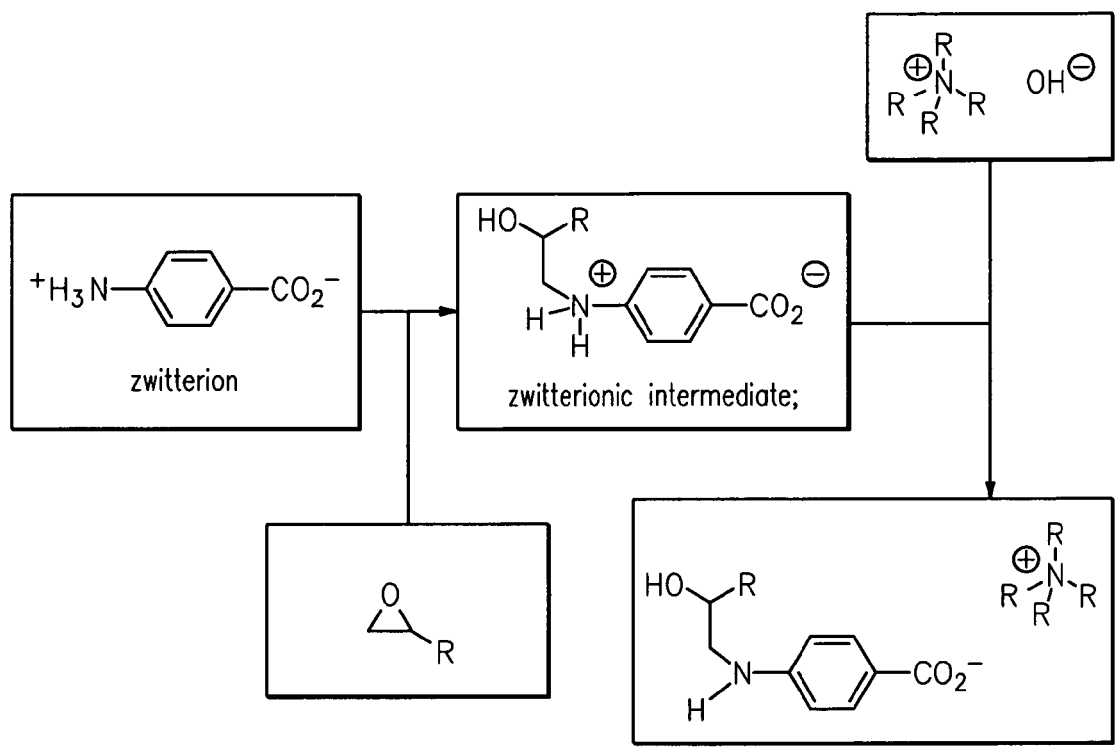

The ionic absorbents for use in the process of the present invention are known and can be prepared by methods known in the art, e.g., as disclosed in U.S. Pat. Nos. 7,208,605 and 7,744,838 and WO 2008/122030, the contents of which are incorporated by reference herein. For example, in one embodiment, the ionic absorbents can be prepared in accordance with the synthetic schemes generally represented in FIGS. 1 and 2 (reactions with primary amines, secondary amines or diamines) via a zwiterionic intermediate. In one embodiment, the ionic absorbents can be prepared in accordance with the synthetic scheme generally represented in FIG. 3 in which the zwiterionic intermediate can be reacted with an epoxide. In one embodiment, the ionic absorbents can be prepared in accordance with the synthetic scheme generally represented in FIG. 4.

While the above examples have shown the reaction of the zwiterionic intermediates with ammonium hydroxide salts, as the base, one may also use other cations as described above, e.g., a phosphonium cation, a heterocyclic (e.g., imidazolium or pyridinium) cation, alkali metal cation or an alkaline earth metal cation as the counterion. In certain embodiments, the cations can be metal cations, such as Na, K, Ca, Ba, etc.

While the selected synthentic routes described above have all suggested reacting hydroxide salts of various cations with the zwitterions, other synthetic approaches can be envisioned as well, such as zwitterion deprotonation with strong bases like NaH or BuLi, followed by an ion metathesis step to exchange the Na or Li for a different cation.

As discussed above, in order for the aqueous ionic absorbent solutions to have a sufficiently high volumetric adsorption capacity for $CO_2$ (mol $CO_2$/mL absorbent), the molecular weight of the neat ionic absorbent should be as low as possible, e.g., a molecular weight of no more than about 700 atomic mass unit (AMU) (g/mole). In one embodiment, the molecular weight of the neat ionic absorbent is from about 75 to about 700 AMU (g/mole). In one embodiment, the molecular weight of the neat ionic absorbent is below about 600 AMU (g/mole). In another embodiment, the molecular weight of the neat ionic absorbent is from about 75 to about 600 AMU (g/mole). In one embodiment, the molecular weight of the neat ionic absorbent is below about 500 AMU (g/mole). In another embodiment, the molecular weight of the neat ionic absorbent is from about 75 to about 500 AMU (g/mole).

The aqueous ionic absorption solutions are particularly useful in a carbon capture process. In general, water vapor is present in carbon dioxide-containing gas streams such as a flue gas stream at varying concentrations from the combustion processes. Due to its presence in the flue gas and its low cost, water is the most desirable diluent for the ionic absorbent. In one embodiment, the use of the aqueous ionic absorbent solutions of the present invention involves (a) contacting a gas stream containing carbon dioxide with the aqueous ionic absorbent solution under absorption conditions to absorb at least a portion of the carbon dioxide from the gas stream and form a carbon dioxide-absorbent complex; and (b) recovering a gaseous product having a reduced $CO_2$ content.

Suitable incoming gas streams typically contain between about 0.03 to about 80% by volume carbon dioxide. In one embodiment, suitable incoming gas streams contain between about 1 to about 33% by volume carbon dioxide. In one embodiment, suitable incoming gas streams contain between about 3 to about 15% by volume carbon dioxide.

The types of incoming gas streams that can be treated include, but are not limited to, flue gas streams from power plants such as coal-fired power plants, natural gas combined cycles, natural gas boilers, natural gas, gas streams from gasification plants, gas from cement manufacturing, reformate gas, synthesis gas, refinery off-gas, biogas and air (e.g., in a space application). If required, the incoming gas stream can be pretreated prior to entering the apparatus (e.g., fractionation, filtration, scrubbing to remove particulates and other gaseous components, and combination or dilution with other gases). Accordingly, the chemical composition may also vary considerably.

The incoming gas streams may further contain other gases such as, for example, $O_2$, $NO_x$ and $SO_x$. Therefore, the use of the aqueous ionic absorbent solutions according to the present invention may also co-absorb one or more of $SO_2$, COS, $NO_x$, COS, and $SO_x$ present in the gas stream. Thus, the aqueous ionic absorbent solutions may be employed to capture all or some of the pollutants in addition to $CO_2$ which are present in the gas stream.

In one embodiment, the use of the aqueous ionic absorbent solution of the present invention will be explained in more detail on the basis of the accompanying figure and the following examples.

Figure 5:
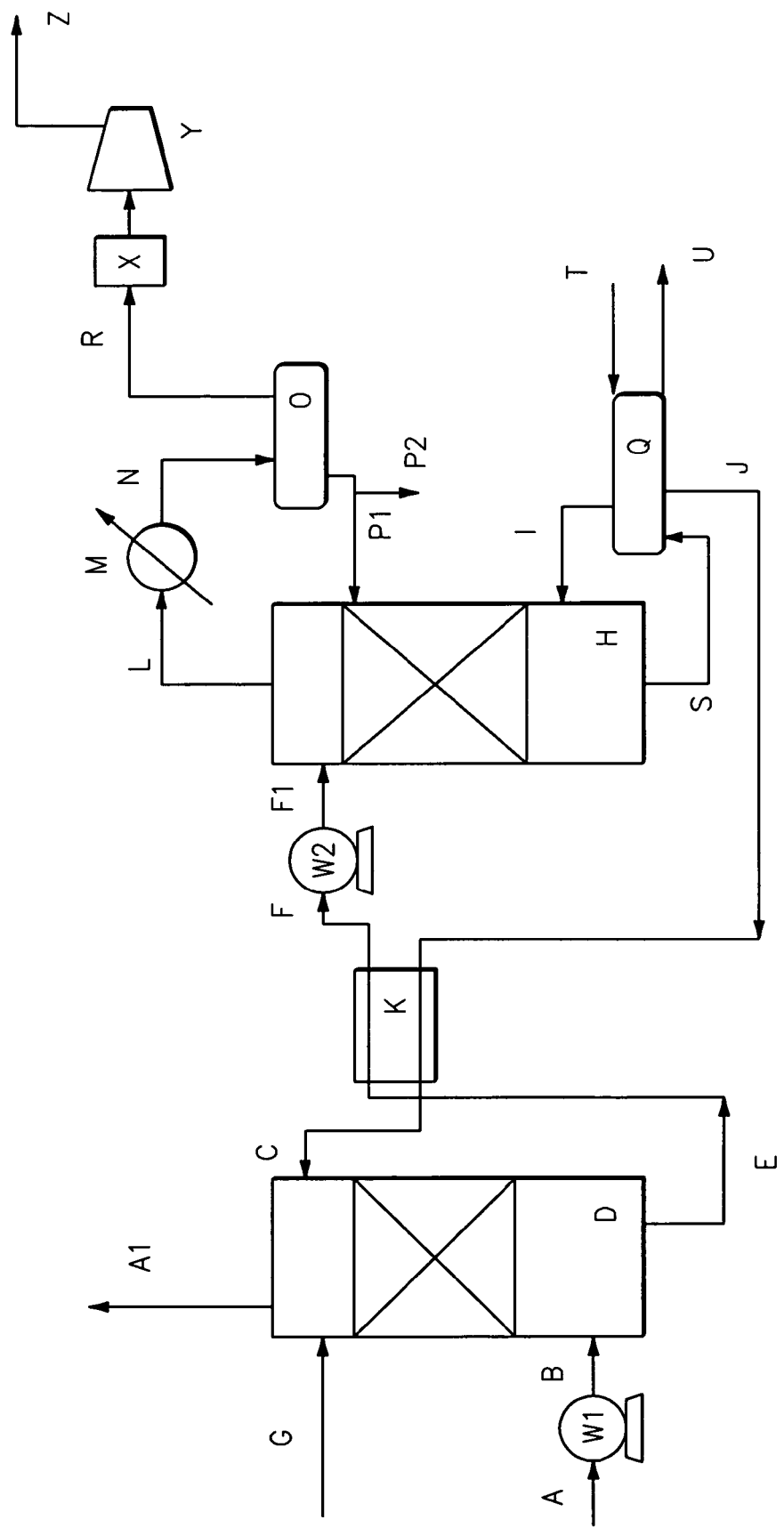
FIG. 5 shows a process flow diagram scheme for the removal of $CO_2$ from a flue gas stream in accordance with one embodiment of the present invention.

FIG. 5 illustrates a process scheme according to one embodiment of the present invention. In general, FIG. 5 includes a carbon dioxide ($CO_2$) separation system for recovering high purity $CO_2$ from flue gas stream (A). First, flue gas stream (A) enters blower (W1), which blows flue gas stream (B) to absorber (D). Blower (W1) can be any type of blower known to one skilled, in the art. Generally, the pressure of flue gas stream (A) is around 1 bar. Blower (W1) raises the pressure of the flue gas stream (A) entering blower (W1) such that flue gas stream (B) exits blower (W1) at a pressure ranging from 1.1 to about 1.5 bar. The pressure is typically raised to overcome the pressure drop associated with flowing the gas through the absorber tower.

In one embodiment, absorber (D) is a packed tower. The packing may be random packing, structured packing or any combination thereof. The randomly packed material can include, but is not limited to, Raschig rings, saddle rings, Pall rings, or any other known type of packing ring, or combination of packing rings. The structured packed material can include, but is not limited to, corrugated sheets, crimped sheets, gauzes, grids, wire mesh, monolith honeycomb structures, or any combination thereof. Examples of structured packing include Sulzer DX™, Mellapak™, Mellapak Plus™, Katapak™, and the like.

As discussed above, water present in the flue gas stream will form an aqueous solution containing the ionic absorbent. If the viscosity of the aqueous solution is not sufficient for use in the process of the present invention, then it may be necessary to add one or more diluents to the aqueous solution to further reduce its viscosity to a viscosity suitable for the process of the present invention. Accordingly, a diluent stream (G) is present at the top of the column to further hydrate the incoming ionic liquid stream (C) and reduce its viscosity as discussed above. In addition, diluent stream (G) can scrub any additional diluent that may be carried over into treated flue gas stream (A1) leaving the absorber (D) to partly or completely remove any unwanted impurities. Typically, the total amount of water and diluents, when present, in the ionic absorbent is largely dictated by viscosity requirements, and is generally less than about 80 wt. %. In one embodiment, the total amount of water present is from about 15 wt. % to about 80 wt. %.

The flue as stream (B) and ionic absorbent stream (C) are contacted in absorber (D). In general, flue gas stream (B) is introduced into chemical absorber (D) and during the process of flow from the bottom up, the carbon dioxide in flue as stream (B) is absorbed by ionic absorbent (C) flowing from the top down. The end gas, i.e., treated flue gas stream (A1), which is essentially depleted of carbon dioxide, is introduced out of the absorber, for example, through a vent from the top of the absorber after contacting (or being scrubbed) by diluent stream G. In one embodiment, from about 80 to about 95% of $CO_2$ in stream A has been removed to form stream A1.

The ionic absorbent stream (E), which has absorbed carbon dioxide ($CO_2$-rich aqueous ionic absorbent solution stream), comes out of absorber (D) from the bottom and is pumped to cross exchanger (K), where its temperature is raised; and then the preheated stream (F) is pumped through pump (W2). Pump (W2) raises the pressure of ionic absorbent stream (E) to greater than about 1.9 bar to provide pressurized ionic absorbent stream (F1). In one embodiment, the pressure of ionic absorbent stream (E) is raised to a pressure of greater than about 1.9 bar to about 10 bar. In one embodiment, the pressure is raised to about 4 bar to about 8 bar. Pump (W2) can be any apparatus capable of raising the pressure of preheated stream (F) such as, for example, a centrifugal pump, a reciprocating pump, a gear pump, etc.

Next, pressurized ionic absorbent stream (F1) is sent to the top of regenerator (H) to flow down through the regenerator where it is further heated to a temperature ranging from about 90° C. to about 200° C. by, for example, steam-heated or hot-oil heated reboiler and under vacuum, atmospheric or high pressure conditions. In one embodiment, pressurized ionic absorbent stream (F1) is sent to the top of regenerator (H) to flow down through the regenerator where it is further heated to a temperature of about 120° C. to about 180° C. In this manner, most of the carbon dioxide in the ionic liquid (F1) is released as a wet carbon dioxide gas stream (L) and emitted out from the top of regenerator (H). Regenerator (H) is a packed tower and can be any random or structure packing as discussed above with absorber (D). The high temperature regeneration allows for greater flexibility in using different levels of steam and/or waste heat resources in reboiler (Q), as discussed below. The regenerator (H) is typically run at relatively high pressure, e.g., a pressure from about 1.9 bar to about 10 bar. By running regenerator (H) at a relatively high pressure, carbon dioxide stream (L) may be recovered at higher pressure thereby reducing the capital and operating costs associated with carbon dioxide compression (Y), discussed below. The ionic absorbent depleted of carbon dioxide, i.e., ionic absorbent stream (S), is emitted out from the bottom of regenerator (H).

In one embodiment, when flue gas stream (A) is first pre-cooled to a temperature of about 40° C. to about 60° C. and then sent to the absorber and contacted with ionic absorbent stream (C), the desorption conditions for removing carbon dioxide from pressurized ionic absorbent stream (F1) may include heating stream (F1) to a temperature of greater than 60° C. to about 80° C. in the case where the regenerator (i.e., stripper) is run at vacuum conditions. In another embodiment, when flue gas stream (A) is first pre-cooled to a temperature of about 40° C. to about 60° C. and then sent to the absorber and contacted with ionic absorbent stream (C), the desorption conditions for removing carbon dioxide from pressurized ionic absorbent stream (F1) may include heating stream (F1) to a temperature of greater than 100° C. to about 120° C. in the case where the regenerator is run at atmospheric conditions. In yet another embodiment, when flue gas stream (A) is first pre-cooled to a temperature of about 40° C. to about 60° C. and then sent to the absorber and contacted with ionic absorbent stream (C), the desorption conditions for removing carbon dioxide from pressurized ionic absorbent stream (F1) may include heating stream (F1) to a temperature of about 120° C. to about 200° C. in the case where the regenerator is run at high-pressure conditions (i.e., 1.9 to 10 bar).

In one embodiment, when flue gas stream (A) is sent to the absorber at a temperature of about 60° C. to about 80° C., the desorption conditions for removing carbon dioxide from pressurized ionic absorbent stream (F1) may include heating stream (F1) to a temperature of about 100° C. to about 200° C. in the case where the regenerator is run at atmospheric or high-pressure conditions.

In one embodiment, when flue gas stream (A) is sent to the absorber at a temperature of about 80° C. to about 100° C., the desorption conditions for removing carbon dioxide from pressurized ionic absorbent stream (F1) may include heating stream (F1) to a temperature of about 120° C. to about 200° C. in the case where the regenerator is run at atmospheric or high-pressure conditions.

The wet carbon dioxide gas stream (L) coming from the top of regenerator (H) is then passed through cooler (M), such as a condenser, where it is cooled to provide cooled carbon dioxide gas stream (N). The temperature of carbon dioxide gas stream (L) is generally decreased to about 30° C. to about 50° C. The cooled carbon dioxide gas stream (N) is sent to separator (O) where condensed water and trace amounts of ionic absorbent and optional diluents is separated and returned to regenerator (H) as reflux (P1) and a portion of water reflux (P2) can optionally be diverted to stream (G). The gas stream (R), as the carbon dioxide product, is sent to gas injection regulatory system (X) where it is dehydrated using methods known in the art, e.g., triethylene glycol dehydration or heatless absorption using molecular sieves. The dehydrated gas is then sent to compressor (Y) to be pressurized, under normal pressure and a temperature of less than about 60° C., to about 7.4 MPa or higher, and sent off to pipeline (Z). In one embodiment, the captured $CO_2$ can be used on-site or can be made available for sale to a co-located facility. Dried $CO_2$ will be compressed in a series of compressors and intercoolers to a final temperature of about 40° C. to about 60° C. The last compression stage would be close to the supercritical pressure of $CO_2$ (i.e., about 1100 psig). Once $CO_2$ is supercritical, it may be pumped as a dense phase fluid to any pressure required for transportation—final dense phase pressure may range from about 100 to about 200 bar.

The reboiler (Q) is a shell and tube heat exchanger. Ionic absorbent stream (S) coming from the bottom of the regenerator (H) enters into the tubes of the reboiler (Q) where it is heated by steam in the shell-side of the reboiler. Stream (T) is the supply heating medium, such as steam that it is available from the facility generating the flue gas (e.g., refinery, gas/oil-fired boiler, power plant, etc.) while stream (U) is the return condensate that is returned back to the utility system of the facility. Therefore, the ionic absorbent stream (S) is heated in the reboiler (Q) and at least a portion of the carbon dioxide and water vapor present therein is released out and leaves from the top of reboiler (Q) into regenerator (H) as stripping gas (I). On the other hand, ionic absorbent solution (J) with significantly decreased content of absorbed carbon dioxide (also referred to as "$CO_2$-lean absorbent solution") is sent back to cross exchanger (K).

The following non-limiting examples are illustrative of the present invention.

Experiments were conducted to measure the $CO_2$ absorption of aqueous ionic solutions according to the present invention and to demonstrate their effectiveness.

The equilibrium $CO_2$ carrying capacity of the aqueous ionic absorbent solutions was measured via a volumetric method. A known quantity of ionic absorbent-water mixture is injected into a sealed pressure vessel containing high purity $CO_2$ gas at pressure of approximately 15 psia, and the vessel is shaken to provide mixing of the solution. The pressure in the vessel decreases as $CO_2$ is absorbed into the solution, and the pressure is monitored until the system reaches an equilibrium pressure. The temperature of the system is controlled and monitored, and an equilibrium pressure is measured for multiple temperatures in each experiment. The initial and final pressure of $CO_2$, the volume of the pressure vessel, and the quantity and composition of the injected ionic absorbent-water mixture are all known.

The measured experimental data are used to calculate the loading of $CO_2$ in the solution, which is reported as moles of $CO_2$ bound per mol of ionic absorbent in the solution. An aqueous ionic absorbent solution is contacted in a sealed vessel with a low partial pressure $CO_2$ gas simulating a flue gas stream. The vessel is maintained at a constant temperature by way of heating tape and is shaken to allow good contact between $CO_2$ and the absorbent solution until the system reaches equilibrium. When the pressure reaches the steady state, then a pressure is recorded and the vessel temperature is changed to the next set point. Based on the equilibrium $CO_2$ pressure, the loading per mole of ionic absorbent is calculated. The measured pressure in the vessel is used to determine the moles of gaseous $CO_2$ present in the vessel before and after $CO_2$ absorption occurs (before and after the solvent is injected into the vessel) using the ideal gas equation of state: $P_{CO2}$ V=n R T, where $P_{CO2}$=partial pressure of $CO_2$ (psia), V=volume of the gas phase in the vessel, n=total moles of $CO_2$ gas, T=measured experimental temperature in degrees Kelvin, and R is the Ideal Gas Constant, which has units of energy per mol per degree Kelvin (approximately 8.314 J/mol K).

The water vapor pressure in the vessel is determined assuming the solvent is an ideal mixture of water and absorbent using the known vapor pressure of water at the temperature of a given experiment (taken from the NIST steam tables, see http://webbook.nist.gov/chemistry/fluid): the partial pressure of water in the vessel is calculated as the vapor pressure of water multiplied by the mol fraction of water in the solvent (which is known from the mass of water and absorbent used in preparing the solvent mixture). Because the ionic materials used as absorbents have negligibly low vapor pressure, the gas in the vessel is composed only of water and $CO_2$. The partial pressure of $CO_2$ is calculated as the difference between the measured total pressure and the water vapor pressure. The difference between the gas-phase quantity of $CO_2$ before and after solvent injection is used to calculate the absorbed quantity of $CO_2$ for various temperatures in a single experiment. The absorbed quantity of $CO_2$ is then divided by the quantity of ionic material in the solvent to calculate the loading as moles of $CO_2$ absorbed per mole of ionic absorbent.

Example 1

The effect of water addition to the ionic absorbents was studied using tetraethylammonium N-isopropyl-N-(3-sulfopropyl)amine (TEA) as the ionic absorbent. Neat TEA is a very viscous material. The addition of water lowered the viscous nature of the TEA significantly. Varying amounts of water was added to the TEA and the time to reach the equilibrium $CO_2$ uptake was determined. The results are summarized below in Table 1.

TABLE 1

| Water Diluent, Wt. % | Time to reach equilibrium $CO_2$ uptake | Viscosity (cSt) at 20° C. | Viscosity (cSt) at 80° C. |
|---|---|---|---|
| 0 | >>2 days | Very viscous | — |
| 25 | ~24 hours | Viscous | — |
| 50 | <1 hour | 10.5 | 1.7 |

As the data show, a neat ionic absorbent (i.e., TEA) provided a significantly longer time to approach equilibrium as compared to (1) the aqueous ionic absorbent solution containing TEA with 25 wt. % water and (2) the aqueous ionic absorbent solution containing TEA with 50 wt. % water, i.e., 2 days versus 24 hours and 1 hour, respectively. The lower viscosity of the aqueous ionic absorbent solution case facilitates rapid mass transfer of $CO_2$ between the gas and liquid phases, and enables $CO_2$ absorption to occur on a faster timescale as compared to the neat ionic absorbent which is mass-transfer limited due to the high viscosity of the absorbent. These results demonstrate that sufficient diluent content is necessary to achieve $CO_2$ removal from gas streams on an industrially-relevant timescale.

Example 2

Two 50 wt. % aqueous ionic absorbent solutions of ionic absorbent were prepared. The ionic absorbents were tetraethylammonium N-isopropyl-N-(3-sulfopropyl)amine (TEA) and tetramethylammonium N-isopropyl-N-(3-sulfopropyl)amine (TMA), respectively. The aqueous ionic absorbent solution was contacted in a sealed vessel with a low partial pressure $CO_2$ gas simulating a model flue gas stream. The vessel was maintained at a constant temperature and is shaken to allow good contact between $CO_2$ and the absorbent ionic absorbent solution until the system reached equilibrium. When the pressure reached the steady state, then a pressure was recorded and then the vessel temperature was changed to the next set point. Based on the equilibrium $CO_2$ pressure, the loading per mole of ionic absorbent was calculated. The $CO_2$ loading of the two ionic absorbents were plotted as a function of $CO_2$ partial pressure in FIG. 6. The data in this figure demonstrate that these solutions have high molar absorption capacities ranging from 0.5 to about 0.85 $CO_2$ absorption loading per mole of ionic absorbent. These absorption capacities are significantly higher than the conventional amine-based solvents such as monoethanolamine (MEA). The $CO_2$ loading for 30 wt. % MEA was also measured and the data are presented in FIG. 7 which shows 0.4 to 0.5 mol $CO_2$ absorbed per mole of MEA (comparative example).

Example 3

Figure 6:
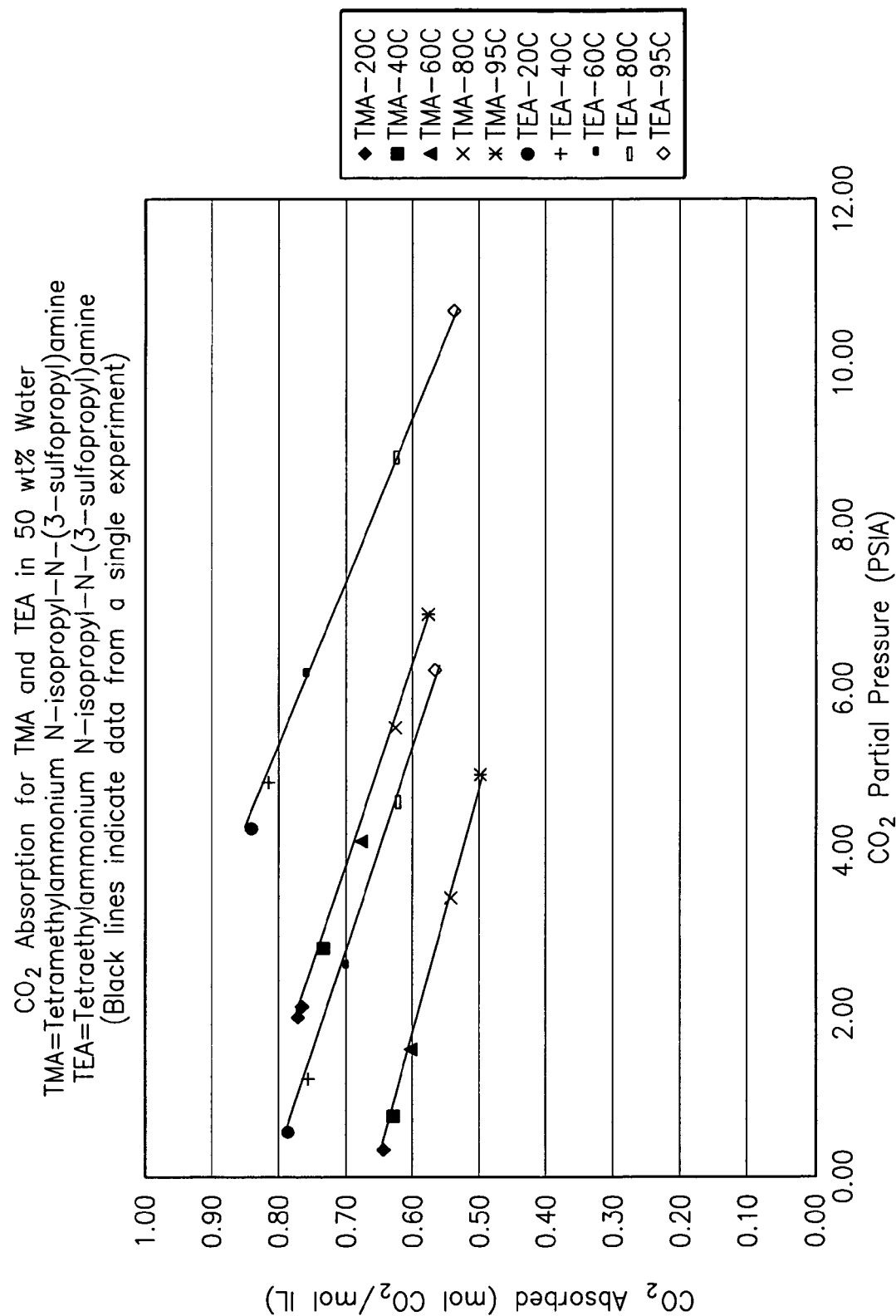
FIG. 6 shows the $CO_2$ loading results at various temperature for amine-functionalized ionic absorbents in accordance with the present invention.

From the data in FIG. 6, the expected $CO_2$ removal capacity of the ionic absorbent from flue gas can be estimated. The plot shows that an aqueous ionic absorbent solution of TMA with 50 wt. % water can absorb up to 0.74 mol $CO_2$ per mol ionic absorbent at 40° C. with a $CO_2$ partial pressure of 2.8 psia. This condition is reflective of the "rich" solution loading in the absorber. The solution absorption capacity for $CO_2$ at 95° C. and a $CO_2$ partial pressure of 5.0 psia decreases to 0.5 mol $CO_2$ per mol aqueous ionic solution. This second condition may reflect the "lean" solution loading achieved in the regeneration column. Therefore, the absorber-regenerator system described herein could remove 0.24 moles of $CO_2$ per mol of TMA ionic absorbent circulated through the absorber-regenerator system per pass.

Since the ionic absorbent for use in the aqueous ionic absorbent solution can be operated in a wide range of temperatures, the $CO_2$ capture process conditions can be chosen to increase the loading difference between the "rich" and "lean" $CO_2$ capacities. As one skilled in the art will readily appreciate, the chemical absorption capacity of solvent decreases with (1) decreasing partial pressure of the absorbed species in the gas phase and (2) increasing temperature. Therefore, by operating the stripper at temperatures in excess of 95° C., the $CO_2$ removal capacity of the system can be further increased. The removal capacity of the system can also be increased by operating the stripper with lower $CO_2$ partial pressure.

Therefore, our results show that that TMA would have the capacity to remove at least 0.24 moles of $CO_2$ per mol of ionic absorbent circulated through the absorber-regenerator system per pass.

Example 4

From the data in FIG. 6, the expected $CO_2$ removal capacity of TEA from flue gas can be estimated. The plot shows that an aqueous ionic absorbent solution of TEA with 50 wt. % water absorb up to 0.76 mol $CO_2$ per mol ionic absorbent at 40° C. with a $CO_2$ partial pressure of 1.2 psia. This condition is reflective of the "rich" solution loading in the absorber. In this TEA-based solution, the absorption capacity for $CO_2$ at 95° C. and a $CO_2$ partial pressure of 6.3 psia decreases to 0.57 mol $CO_2$ per mol aqueous ionic solution. This second condition may reflect the "lean" solution loading achieved in the regeneration column. Therefore, the absorber-regenerator system described herein could remove 0.19 moles of $CO_2$ per mol of aqueous ionic absorbent solution circulated through the absorber-regenerator system. As in the previous example, the $CO_2$ removal capacity of the system will be further increased by operating the stripper at higher temperatures and/or operating the stripper at lower $CO_2$ partial pressure.

Therefore, our results show that TEA would have the capacity to remove at least 0.19 moles of $CO_2$ per mol of ionic absorbent circulated through the absorber-regenerator system per pass.

Comparative Example A

Figure 7:
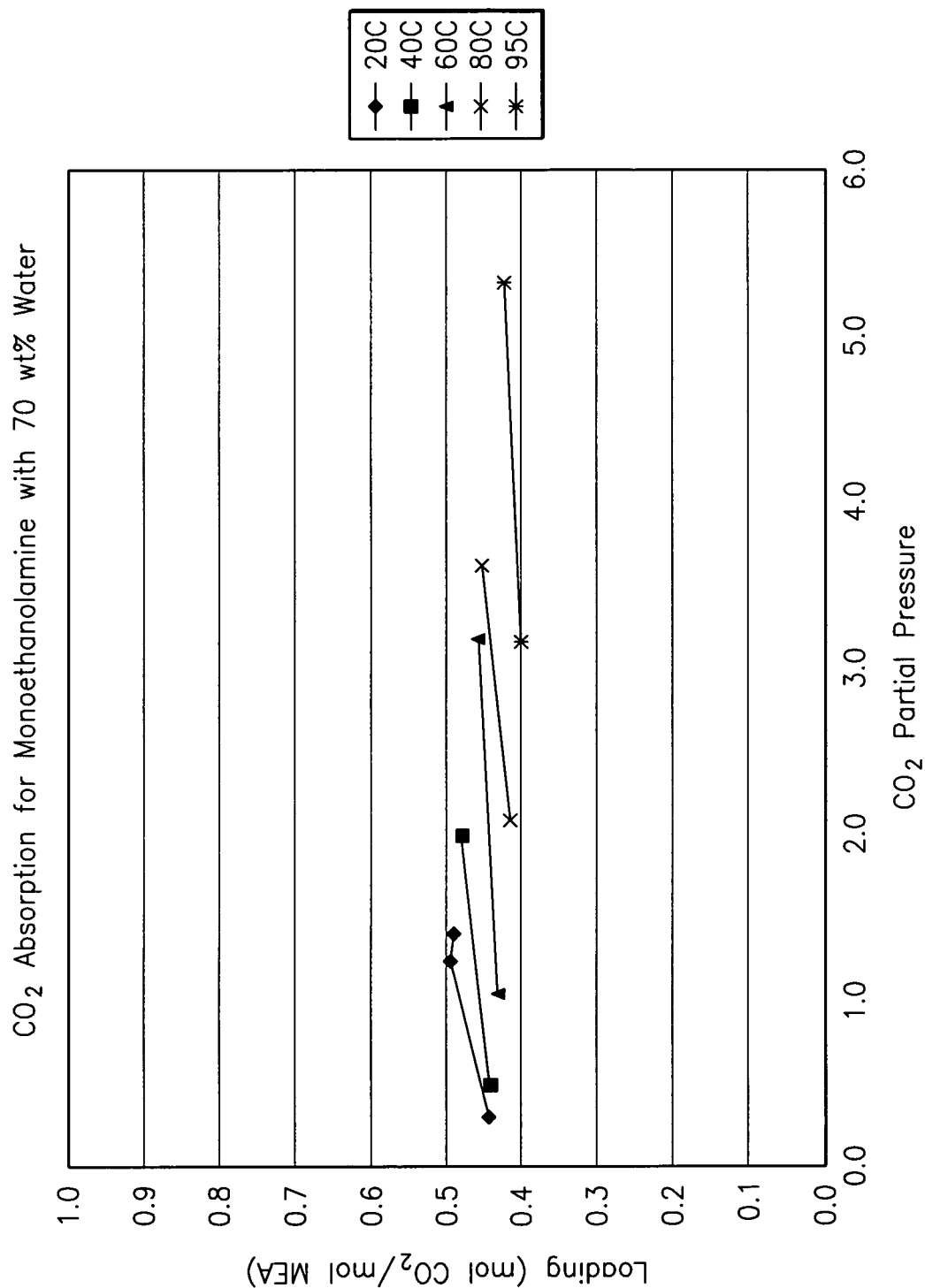
FIG. 7 shows the $CO_2$ loading results at various temperature for monoethanolamine in 70 wt. % water.

FIG. 7 shows measured $CO_2$ absorption data for an aqueous solution containing 30 wt. % MEA with 70 wt. % water. At 20° C., the absorption capacity for $CO_2$ at a $CO_2$ partial pressure of 1.5 psia was approximately 0.5 mol $CO_2$ per mol MEA, which reflects the loading in the absorption column. By heating the solution at 95° C. and a $CO_2$ partial pressure of 3.0 psia, the measured loading decreases to 0.4 mol $CO_2$ per mol of MEA. This second condition reflects the "lean" solution loading achieved in the regeneration column. Therefore, the absorber-regenerator system using an aqueous solution of MEA under these conditions could remove 0.10 moles of $CO_2$ per mol of MEA. When comparing Comparative Example A with Examples 2 and 3, the capacities of aqueous ionic absorbent solution containing TEA and TMA, respectively, for $CO_2$ are higher than that of aqueous MEA, measured as moles of $CO_2$ captured per mol of absorbent.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. An aqueous ionic absorbent solution comprising (a) about 40 wt. % to about 80 wt. % of one or more diluents, based on the total weight of the aqueous ionic absorbent solution; and (b) an ionic absorbent containing a cation and an anion comprising an amine moiety, wherein the cation comprises one or more cations selected from the group consisting of an ammonium cation and a phosphonium cation, wherein the anion comprising an amine moiety is represented by the general formula:

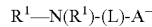

wherein $R^1$ is the same or different and includes hydrogen, a straight or branched $C_1$ to $C_{30}$ substituted or unsubstituted alkyl group, a $C_1$ to $C_{20}$ ester-containing group, a substituted or unsubstituted $C_3$ to $C_{30}$ cycloalkyl group, a substituted or unsubstituted $C_3$ to $C_{30}$ cycloalkylalkyl group, a substituted or unsubstituted $C_3$ to $C_{30}$ cycloalkenyl group, a substituted or unsubstituted $C_5$ to $C_{30}$ aryl group, a substituted or unsubstituted $C_5$ to $C_{30}$ arylalkyl group, a substituted or unsubstituted $C_5$ to $C_{30}$ heteroaryl group, a substituted or unsubstituted $C_3$ to $C_{30}$ heterocyclic ring, a substituted or unsubstituted $C_4$ to $C_{30}$ heterocycloalkyl group, a substituted or unsubstituted $C_6$ to $C_{30}$ heteroarylalkyl group, wherein if one $R^1$ group is hydrogen, then the other $R^1$ group is not hydrogen, or $R^1$ and $R^1$ together with the nitrogen atom to which they are bonded are joined together to form a heterocyclic group; L is a linking group; and $A^-$ is an anionic moiety, and further wherein the aqueous ionic absorbent solution has a viscosity of about 0.1 to about 100 centistokes (cSt).

2. The aqueous ionic absorbent solution of claim 1, wherein the one or more diluents comprise water.

3. The aqueous ionic absorbent solution of claim 1, wherein the one or more diluents comprise a diluent selected from the group consisting of a monohydric alcohol, a polyol and mixtures thereof.

4. The aqueous ionic absorbent solution of claim 1, wherein the amount of the one or more diluents is from about 40 wt. % to about 70 wt. % diluent, based on the total weight of the aqueous ionic absorbent solution.

5. The aqueous ionic absorbent solution of claim 1, wherein the cation comprises one or more cations selected from the group consisting of a quaternary ammonium cation and a quaternary phosphonium cation.

6. The aqueous ionic absorbent solution of claim 1, wherein the cation has a molecular weight of about 18 to about 500 atomic mass unit (AMU).

7. The aqueous ionic absorbent solution of claim 1, wherein $R^1$ is the same or different and is a straight or branched $C_1$ to $C_6$ substituted or unsubstituted alkyl group, and L is a divalent straight or branched $C_1$ to $C_6$ substituted or unsubstituted alkyl group.

8. The aqueous ionic absorbent solution of claim 1, wherein the ionic absorbent is selected from the group consisting, of tetrabutylammonium N-propyl-N-(3-sulfopropyl)

amine, tetrabutylphosphoniun N-isopropyl-N-(3-sulfopropyl)amine, tetraethylammonium N-isopropyl-N-(3-sulfopropyl)amine and mixtures thereof.

9. The aqueous ionic absorbent solution of claim 1, wherein the molecular weight of the ionic absorbent is from about 75 to about 700 AMU.

10. The aqueous ionic absorbent solution of claim 1, wherein the molecular weight of the ionic absorbent is from about 75 to about 600 AMU.

11. The aqueous ionic absorbent solution of claim 1, wherein the molecular weight of the ionic absorbent is from about 75 to about 500 AMU.

12. The aqueous ionic absorbent solution of claim 1, wherein the molecular weight of the ionic absorbent is from about 75 to about 400 AMU.

13. The aqueous ionic absorbent solution of claim 1, wherein the molecular weight of the ionic absorbent is from about 75 to About 300 AMU.

14. The aqueous ionic absorbent solution of claim 1, having a viscosity of about 0.5 to about 40 cSt.

15. The aqueous ionic absorbent solution of claim 1, wherein the amount of the one or more diluents is from about 40 wt. % to about 60 wt. % diluent, based on the total weight of the aqueous ionic absorbent solution.

* * * * *